United States Patent Office 3,823,174
Patented July 9, 1974

3,823,174
PROCESS FOR PREPARATION OF
AROMATIC ISOCYANATES
Philip D. Hammond, North Haven, and Nicholas B.
Franco, Brookfield, Conn., assignors to Olin Corporation, New Haven, Conn.
No Drawing. Filed Dec. 18, 1972, Ser. No. 315,937
Int. Cl. C07c 119/04
U.S. Cl. 260—453 PC                    11 Claims

ABSTRACT OF THE DISCLOSURE

Aromatic isocyanates are produced directly from aromatic nitro compounds in a batch or continuous process in which carbon monoxide and aromatic nitro compounds are reacted in the presence of a solvent and catalyst at an elevated temperature and pressure until there is essentially complete conversion of the nitro compound followed by the reaction of successive charges of additional nitro compound.

This invention relates to a batch or continuous process for preparing aromatic isocyanates.

There is an increasing demand for organic isocyanates for use in the preparation of urethane foams and coatings, as well as in the preparation of insecticides, pesticides and the like.

Considerable effort has been expended recently in developing processes for preparing aromatic isocyanates directly from aromatic nitro compounds by reacting the aromatic nitro compound with carbon monoxide in the presence of a noble metal catalyst, particularly palladium halides and rhodium halides, and generally utilizing a cocatalyst. For example, U.S. Pat. No. 3,576,835 discloses the use of a catalyst comprised of a noble metal halide and a hetero-aromatic nitrogen compound. In addition, U.S. Pat. No. 3,523,966 discloses the use of a noble metal-based catalyst and certain non-noble metal-based catalysts. Although the techniques described in these patents are useful in preparing aromatic isocyanates, there is a need for improving the economics of such techniques in order to make the process more profitable.

It is generally known that processes for preparing aromatic isocyanates such as described above involve some formation of undesirable by-products plus some decomposition of the catalyst originally charged. Now it has been found in accordance with the process of this invention, that the effect of by-product formation and catalyst decomposition can be controlled or minimized thus making the process more efficient and economical. This is based on the finding that by-product formation and catalyst decomposition largely occur during the initial stages of an operation. The process of this invention involves the reaction of carbon monoxide with an aromatic nitro compound in the presence of a solvent and catalyst at an elevated temperature and pressure until there is essentially complete conversion of the nitro compound followed by the addition of fresh nitro compound and reaction thereof. While this process may be utilized for continuous operation it is particularly efficacious for batch operation where it makes the most effective use of a limited amount of catalyst and equipment and also involves simpler handling techniques.

While the process of this invention generally involves the addition of fresh aromatic nitro compound to the original reaction mixture, the process may alternatively be run by adding the fresh nitro compound plus any needed solvent to the solids which have been separated from the previous cycle and then continuing the reaction. The process can also be run by using the filtrate recovered from the filtering of the previous cycles reaction product and adding fresh nitro compound and then continuing the reaction. However, the preferred process is the addition of fresh nitro compound to the original reaction mixture and reaction thereof.

In carrying out the process of this invention the same charge of catalyst can be used in several successive batches however, improved efficiency will result if a small amount of regenerator are added. This principle of in-situ catalyst regeneration is disclosed in co-pending application Ser. No. 170,286 entitled "Process for Preparing Noble Metal Complexes" by Hammond, Litz and Manemeit.

In carrying out the method of this invention any aromatic nitro compound capable of being converted to an aromatic isocyanate may be employed as a reactant. As used herein, the term "aromatic nitro compound" represents those organic compounds having at least one nitro group attached directly to an aromatic hydrocarbon or carbocyclic nucleus such as benzene, naphthalene and the like, wherein the aromatic nucleus may also contain other substituents as illustrated below. Among the preferred aromatic nitro compounds which may be used in the practice of this invention are the nitrobenzenes, both mono- and polynitro, including isomeric mixtures thereof; the alkylnitrobenzenes, including the various nitrated toluenes and the nitrated xylenes; nitrated biphenyl and nitrated diphenylmethanes. Other preferred reactants include bis(nitrophenoxy)alkanes and bis(nitrophenoxy) alkylene ethers. Typical examples of suitable aromatic nitro compounds which can be reacted to form isocyanates include the following:

(a) Nitrobenzene
(b) Nitronaphthalenes
(c) Nitroanthracenes
(d) Nitrobiphenyls
(e) Bis(nitrophenyl) methanes
(f) Bis(nitrophenyl) thioethers
(g) Bis(nitrophenyl) ethers
(h) Bis(nitrophenyl) sulfones
(i) Nitrodiphenoxy alkanes
(j) Nitrophenothiazines All of the aforementioned compounds may be substituted with one or more additional substituents such as nitro, alkyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrobibenzyl
14. Bis(p-nitrophenyl)methane
15. Bis(2,4-dinitrophenyl)methane
16. Bis(p-nitrophenyl) ether
17. Bis(2,4-dinitrophenyl)ether
18. Bis(p-nitrophenyl) thioether
19. Bis(p-nitrophenyl) sulfone
20. Bis(p-nitrophenoxy) ethane
21. Bis(p-nitrophenoxy) diethylene ether
22. 2,4,6-Trinitrotoluene
23. 1,3,5-Trinitrobenzene
24. 1-Chloro-2-nitrobenzene 25. 1-Chloro-4-nitrobenzene
26. 1-Chloro-3-nitrobenzene
27. Nitrodiphenyl methane
28. 2-Chloro-6-nitrotoluene
29. 4-Chloro-3-nitrotoluene
30. 1-Chloro-2,4-dinitrobenzene
31. 1,4-Dichloro-2-nitrobenzene
32. α-Chloro-p-nitrotoluene
33. 1,3,5-Trichloro-2-nitrobenzene
34. 1,3,5-Trichloro-2,4-dinitrobenzene
35. 1,2-Dichloro-4-nitrobenzene
36. α-Chloro-m-nitrotoluene
37. 1,2,4-Trichloro-5-nitrobenzene
38. 1-Bromo-4-nitrobenzene
39. 1-Bromo-2-nitrobenzene
40. 1-Bromo-3-nitrobenzene
41. 1-Bromo-2,4-dinitrobenzene
42. α,α-Dibromo-p-nitrotoluene
43. α-Bromo-p-nitrotoluene
44. 1-Fluoro-4-nitrobenzene
45. 1-Fluoro-2,4-dinitrobenzene
46. 1-Fluoro-2-nitrobenzene
47. o-Nitrophenyl isocyanate
48. m-Nitrophenyl isocyanate
49. p-Nitrophenyl isocyanate
50. o-Nitroanisole
51. p-Nitroanisole
52. p-Nitrophenetole
53. o-Nitrophenetole
54. 2,4-Dinitrophenetole
55. 2,4-Dinitroanisole
56. 1-Chloro-2,4-dimethoxy-5-nitrobenzene
57. 1,4-Dimethoxy-2-nitrobenzene
58. m-Nitrobenzaldehyde
59. p-Nitrobenzaldehyde
60. p-Nitrobenzoylchloride
61. m-Nitrobenzoylchloride
62. 3,5-Dinitrobenzoylchloride
63. Ethyl p-nitrobenzoate
64. Methyl o-nitrobenzoate
65. m-Nitrobenzenesulfonylchloride
66. p-Nitrobenzenesulfonylchloride
67. o-Nitrobenzensulfonylchloride
68. 4-Chloro-3-nitrobenzenesulfonylchloride
69. 2,4-Dinitrobenzenesulfonylchloride
70. 3-Nitrophthalic anhydride
71. p-Nitrobenzonitrile
72. m-Nitrobenzonitrile
73. 3,3'-Dimethoxy-4,4'-dinitro-biphenyl
74. 3,3'-Dimethyl-4,4'-dinitro-biphenyl
75. 2-Isocyanato-4-nitrotoluene
76. 4-Isocyanato-2-nitrotoluene In addition, isomers and mixtures of the aforesaid aromatic nitro compounds and substituted aromatic nitro compounds may also be employed, as well as homologues and other related compounds. Generally, the aromatic nitro compounds contain from 6 to 20 and preferably from 6 to 14 carbon atoms.

Any catalyst which is capable of enhancing the conversion of aromatic nitro compounds to aromatic isocyanates may be used in this invention. More particularly, the preferred catalysts used in this invention may be a complex or mixture of at least one heteroaromatic nitrogen compound with at least one noble metal halide. The heteroaromatic nitrogen compound is one containing between five and six members in the ring, containing only nitrogen and carbon in the ring, containing no more than two nitrogen atoms in the ring, and containing at least two double bonds in the ring. Suitable compounds of this type are disclosed in the Ring Index by Patterson and Capell, Second Edition, American Chemical Society, 1960 and Supplements I, II and III and in U.S. Pat. 3,576,835. Derivatives of the heteroaromatic nitrogen compounds such as disclosed in U.S. 3,576,835 may also be used. The preferred heteroaromatic nitrogen compounds are pyridine, quinoline and isoquinoline.

Any noble metal halide capable of forming a complex with the above-described heteroaromatic nitrogen compound may be used. Useful noble metals include palladium, rhodium, ruthenium, platinum, osmium, iridium, rhenium, silver and gold with the metals of the platinum series, i.e. palladium, rhodium, ruthenium, platinum, osmium and iridium being preferred. The most preferred noble metals are palladium, rhodium, platinum, and iridium and chloride is the most preferred halide. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridum triiodide, iridium tetraiodide, and mixtures thereof. Preferred noble metal halides are selected from the group consisting of palladous dichloride, rhodium trichloride, iridium trichloride and platinum tetrachloride and mixtures thereof, the more preferred noble metal halides being palladous dichloride and rhodium trichloride.

Particularly preferred catalyst complexes are Pd(pyridine)$_2$Cl$_2$, Pd(pyridine)$_2$Cl$_4$, Rh(pyridine)$_3$Cl$_3$, Pd(isoquinoline)$_2$Cl$_2$, Pd(isoquinoline)$_2$Cl$_4$ and Rh(isoquinoline)$_3$Cl$_3$. Further disclosure of catalysts of this type and the method of preparation may be found in U.S. Pat. No. 3,576,835, issued Apr. 27, 1971 to Eric Smith et al.

In addition to the above described catalyst complexes or mixtures, the catalyst system may include a co-catalyst such as pyridine hydrochloride.

As noted previously, the effective use of the catalyst can be improved if a small portion of catalyst regenerator is added to the reaction mixture of the earlier cycle along with fresh aromatic nitro compound. The catalyst regenerators which may be used are disclosed in the noted application Ser. No. 170,286. Particularly useful regenerators in this application include the hydrohalide derivatives of heteroaromatic nitrogen compounds such as pyridine, quinoline and isoquinoline. The hydrochloride and hydrobromide derivatives of pyridine, quinoline and isoquinoline are most preferred. Any suitable proportion of the hydrohalide derivative may be employed, although this proportion usually need not exceed that which is required stoichiometrically to react with all of the noble metal in the catalyst.

Some improvement in the conversion and yield of organic isocyanates can be obtained by employing a catalyst system which not only contains a mixture or comppex of the aforesaid heterocyclic nitrogen-containing compound and metal halide, but also contains a third component compound of certain metal oxides. The metal oxides which may be used include the oxides of iron, molybdenum, chromium, tungsten, vanadium, niobium and tantalum. The use of iron oxides is disclosed in U.S. Pat. 3,674,827. The other oxides are further described in U.S. Pat. 3,576,835. Suitable oxides of this type include ferric oxide (Fe$_2$O$_3$), ferrous oxide (FeO), chromic oxide chromium dioxide (CrO$_2$), and chromous oxide (CrO); molybdenum sesquioxide (Mo$_2$O$_2$), molybdenum dioxide (MoO$_2$) and molybdenum trioxide (MoO$_3$); niobium monoxide (NbO), niobium oxide (NbO$_2$) and niobium pentoxide (Nb$_2$O$_5$); tantalum dioxide (Ta$_2$O$_2$), tantalum tetraxodie (Ta$_2$O$_4$), and tantalum pentoxide (Ta$_2$O$_5$); tungstic oxide (WO$_2$) and tungstic trioxide (WO$_3$); vanadium dioxide (V$_2$O$_2$), vanadium trioxide (V$_2$O$_3$), vanadium tetraoxide (V$_2$O$_4$) and vanadium pentoxide (V$_2$O$_5$). One of the preferred metal oxides is molybdenum trioxide.

Any solvent which is chemically inert to the components of the reaction system may be employed. Suitable solvents include aliphatic, cycloaliphatic and aromatic solvents such as n-heptane, cyclohexane, benzene, toluene and xylene, and halogenated aliphatic and aromatic hydrocarbons such as dichloromethane, tetrachloroethane, monochlorobenzene, dichlorobenzene, trichlorobenzene, perchloroethylene, aromatic nitro compounds such as nitrobenzene, mixtures thereof and the like. It is preferred to employ dichlorobenzene as the solvent.

Generally the quantity of carbon monoxide in the free space of the reactor is sufficient to maintain the desired pressure as well as provide reactant for the process. The pressure at which the carbon monoxide is fed to the reactor is generally from about 30 to about 10,000 p.s.i.g. and preferably from about 1,000 to about 5,000. Greater or lesser pressures may be employed if desired.

The total amount of carbon monoxide added during the reaction is generally from about 3 to about 50 and preferably from about 8 to about 15 moles of carbon monoxide per nitro group in the aromatic nitro compound, however, greater or lesser amounts may be employed if desired.

The reaction is carried out in the presence of a catalytic proportion of the catalyst. More particularly, the proportion of catalyst is generally equivalent to from about 0.001 to about 500 percent, and preferably from about 1 to about 100 percent by weight of the aromatic nitro compound. Greater or lesser amounts may be employed if desired.

The amount of solvent which may be used is not critical and generally the weight percent of aromatic nitro compound in the solvent will be in the range from about 2.0 to about 75 percent, but greater or lesser proportions may be employed if desired.

The amount of fresh aromatic nitro compound added in the successive charges is not particularly critical and will vary depending on the various conditions and equipment limitations. Generally up to about 100 percent by weight of the amount of aromatic nitro compound originally charged may be added however, greater amounts may be used if desired.

The reaction temperature is generally maintained above about 150° C. and more particularly from about 150 to about 300° C. and preferably from about 190 to about 220° C. Interior and/or exterior heating and cooling means may be employed to maintain the temperature in the reactor within the desired range.

The reaction time will vary widely and is dependent upon the aromatic nitro compound being reacted, temperature, pressure and on the amount of catalyst being charged, as well as the type of equipment being employed. As noted earlier, the first stage or cycle is operated until there is essentially complete conversion. The degree of completeness of the reaction can be found by determining the quantity of $CO_2$ gas which is formed during the reaction. It is further noted that the first stage of the reaction can be run for a substantially shorter period than required for complete conversion of all the aromatic nitro compound. In other words, the reaction can be initially run until there is a significant, although not complete, degree of conversion of the nitro compound. Generally, the reaction can be run for periods of up to about 120 minutes during the first stage but a greater period of time can be used if desired. The successive stages can be run for varying periods of time with the desired goal of complete conversion being the determining factor.

The following examples are presented to describe the invention more fully without any intention of being limited thereby. All parts and percentages are by weight unless otherwise specified.

EXAMPLE I

A stainless steel autoclave reactor was charged with 2.88 grams of 2,4-dinitrotoluene (12%), 19.68 grams of ortho-dichlorobenzene (82%), 0.96 grams of dichloro-bis-(pyridine)palladium-Pd(pyridine)$_2$Cl$_2$ (4%) and 0.48 grams of molybdenum trioxide (2%). The reactor was then closed and pressurized to 2500 p.s.i.g. with carbon monoxide gas. Agitation was then started and heating begun until a temperature of 200° C. was attained after 20 minutes. This temperature was maintained for 5 minutes.

The reaction mixture was then charged with 3 grams of fresh dinitrotoluene and the reaction run for 180 minutes under the conditions noted above. The reactor was cooled to room temperature and the pressure released by venting off gases. The reaction product was analyzed by vapor phase chromatography and showed a conversion of 96% of dinitrotoluene, a yield of 33% of toluene diisocyanate and a total yield of isocyanate products of 74%.

For purposes of comparison, a run was made using the same materials and conditions as above except that no fresh dinitrotoluene was added. The resulting product showed a conversion of 100%, a yield of 68% toluene diisocyanate and a total yield of isocyanate products of 68%. This indicated a yield of 32% of undesirable by-products when no fresh dinitrotoluene was added as compared to 26% when fresh dinitrotoluene was added.

EXAMPLE II

A stainless steel autoclave reactor was charged with 15 grams of 2,4-dinitrotoluene, 6 grams of dichlorobis(isoquinoline) palladium, 3 grams of chromic oxide, 3 grams of ferric oxide and 123 grams of ortho-dichlorobenzene. The reactor was then closed and pressurized to 3000 p.s.i.g. with carbon monoxide gas. Agitation was started and the reactor heated to 210° C. and maintained there for 90 minutes. The reaction product from this operation showed a 100% conversion, 65% yield of toluene diisocyanate and a total yield of isocyanate products of 79%.

The solids from the run noted above were mixed with 15 grams of 2,4-dinitrotoluene, 0.1 grams of dichloro bis-(isoquinoline) palladium, 0.3 mole (0.7 grams) of isoquinoline hydrochloride/mole of initial catalyst and sufficient orthodichlorobenzene to make the amount of total charge 150 grams. Using the same conditions as above, the reaction was run for 90 minutes. The resulting reaction product showed a 100% conversion, 59% yield of toluene diisocyanate and a total yield of isocyanate products of 80%.

EXAMPLE III

The procedure using the same conditions and starting materials as in Example I was followed. After the initial reaction (5 minutes), the autoclave was emptied, the reaction mixture cooled and filtered. The filtrate plus recovered catalyst complex (approximately 0.7 grams) from filter cake, was added to 3 grams of fresh dinitrotoluene and 0.45 grams of molybdenum trioxide. The reaction was then run for another 180 minutes under the conditions previously used. The reactor was cooled to room temperature and the pressure released by venting off gases. The reaction product was analyzed by vapor phase chromatography and showed a conversion of 97%, a yield of 31% of toluene diisocyanate and a total yield of isocyanate products of 65%.

What is claimed is:

1. A process for preparing an aromatic isocyanate which comprises reacting an aromatic nitro compound containing up to 20 carbon atoms with carbon monoxide at an elevated temperature and an elevated pressure in the presence of an inert organic solvent and a catalyst complex or mixture comprised of:
   (a) a heteroaromatic nitrogen compound having a ring containing
      (i) between 5 and 6 members
      (ii) only nitrogen and carbon
      (iii) no more than two nitrogen atoms and
      (iv) at least two double bonds and
   (b) a noble metal halide,
said aromatic nitro compound being added in successive charges, the reaction being run after the initial charge of aromatic nitro compound until there is a significant conversion of said aromatic nitro compound and then an additional charge of fresh aromatic nitro compound is added to the reaction mixture and the reaction run until there is essentially complete conversion of the aromatic nitro compound.

2. The process of claim 1 wherein said elevated temperature is from about 150 to about 300° C. and said elevated pressure is from about 30 to about 10,000 p.s.i.g.

3. The process of claim 2 wherein said heteroaromatic nitrogen compound is selected from the group consisting of pyridine, quinoline and isoquinoline and said noble metal halide is selected from the group consisting of the chlorides of palladinum, rhodium, platinum and iridium.

4. The process of claim 3 wherein a catalyst regenerator selected from the group consisting of the hydrohalide derivatives of pyridine, quinoline and isoquinoline is added along with said successive charge of aromatic nitro compound.

5. The process of claim 3 wherein said catalyst complex or mixture contains a third component comprised of an oxide of a metal selected from the group consisting of iron, molybdenum, chromium, tungsten, vanadium, niobium and tantalum.

6. The process of claim 5 wherein said aromatic nitro compound is dinitrotoluene.

7. The process of claim 5 wherein the proportion of carbon monoxide used is from about 3 to about 50 moles of carbon monoxide per nitro group in the aromatic nitro compound.

8. The process of claim 7 wherein the proportion of said catalyst complex or mixture is from about 0.001 to about 500 percent by weight of said aromatic nitro compound.

9. The process of claim 8 wherein said catalyst complex is selected from the group consisting of $Pd(pyridine)_2Cl_2$, $Pd(pyridine)_2Cl_4$, $Rh(pyridine)_3Cl_3$, $Pd(isoquinoline)_2Cl_2$, $Pd(isoquinoline)_2Cl_4$ and $Rh(isoquinoline)_3Cl_3$.

10. The process of claim 1 wherein said elevated temperature is from about 190 to about 220° C., said elevated pressure is from about 1000 to about 5000 p.s.i.g., said proportion of carbon monoxide used is from about 8 to about 15 moles of carbon monoxide per nitro group in the aromatic nitro compound and the proportion of said catalyst complex or mixture is from about 1 to about 100 percent by weight of said aromatic nitro compound.

11. The process of claim 1 wherein after said initial charge of aromatic nitro compound the reaction is run until there is essentially complete conversion of the aromatic nitro compound.

References Cited
UNITED STATES PATENTS

| | | | |
|---|---|---|---|
| 3,576,835 | 4/1971 | Smith et al. | 260—453 |
| 3,719,699 | 3/1973 | McClure et al. | 260—453 |

LEWIS GOTTS, Primary Examiner

D. H. TORRENCE, Assistance Examiner